March 23, 1954  M. A. SCHINKER  2,673,068
WINCH FOR FREIGHT LOADING
Filed Nov. 22, 1950
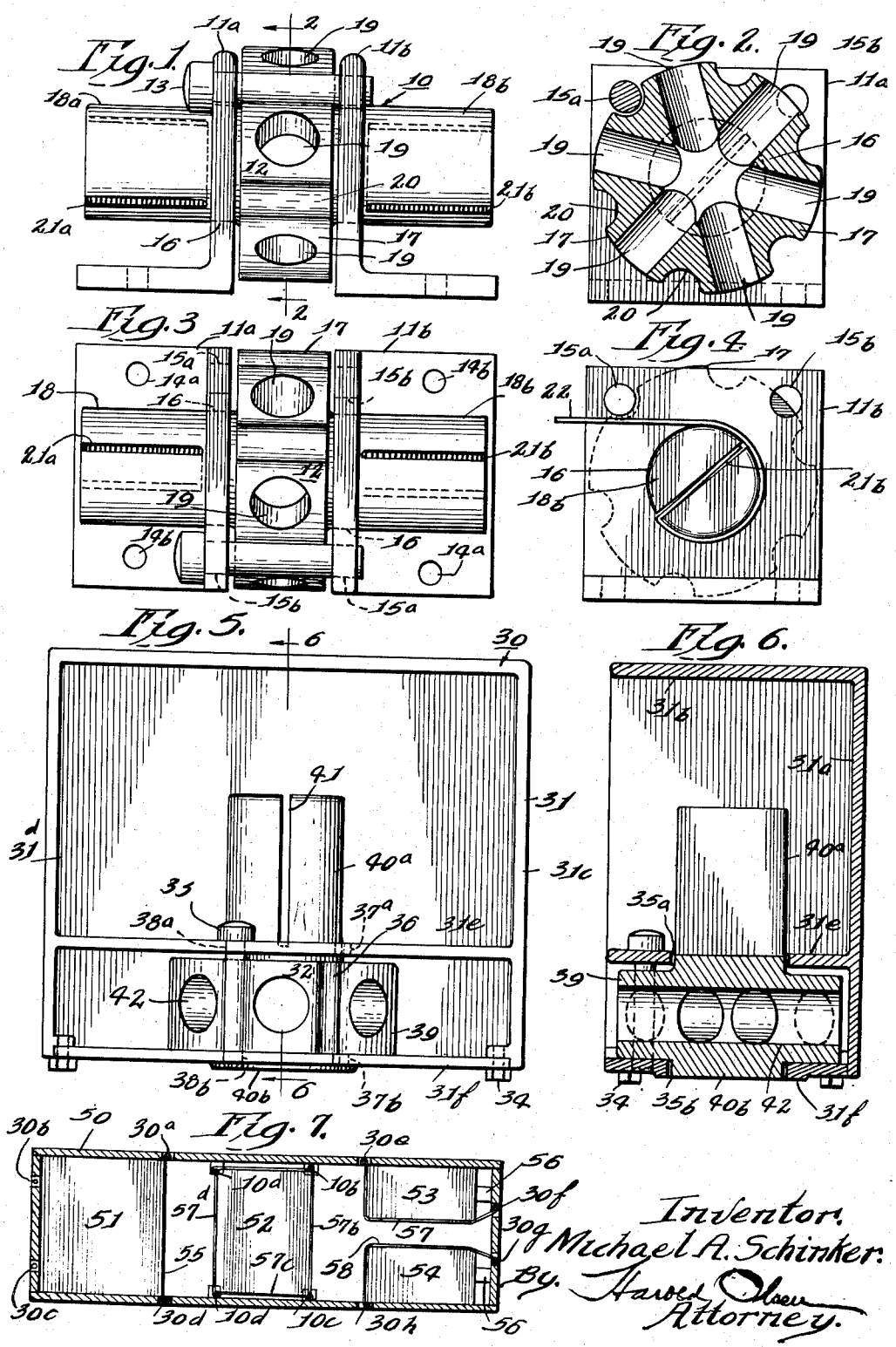
Inventor:
Michael A. Schinker
By Harold Olsen
Attorney.

Patented Mar. 23, 1954

2,673,068

UNITED STATES PATENT OFFICE 2,673,068

WINCH FOR FREIGHT LOADING

Michael A. Schinker, Chicago, Ill.

Application November 22, 1950, Serial No. 197,126

3 Claims. (Cl. 254—161)

The present invention relates to load securing devices and, more particularly, to devices especially useful in restraining freight from shifting during transportation.

In the loading of transportation vehicles, such as freight cars and trucks, it has been the usual practice to secure boxes, crates and the like by means of cleats, braces and anchor plates which are nailed, screwed or bolted to the floor and walls of the transportation vehicle. The cleats, braces and anchor plates are fastened to the transportation vehicle at various points in accordance with the size and shape of the various pieces of freight making up the load and when the freight load is removed from the vehicle upon reaching its destination, the cleats, braces and anchor plates are removed from the vehicle. The repeated fastening and removing of the cleats, braces and anchor plates causes considerable damage to the transportation vehicle. In many cases the damage to the vehicle is so extensive that it becomes a "leaker" and cannot be used to transport friable materials, such as sand, gravel, grain or the like, because a considerable amount of the material would leak out of the vehicle during transportation. Furthermore, a freight load secured in this manner frequently works loose and is shifted during the course of travel of the vehicle due to the sudden stopping and starting of the vehicle and also due to the vibrations caused by the road bed over which the vehicle travels. In order to avoid possible damage to the freight that has been shifted during the course of travel, it is frequently necessary to resecure the freight load by fastening additional cleats, braces and anchor plates.

Another method of securing freight loads employs one or more metal binders or bands which are looped around several pieces of freight and the opposite ends are secured together by means of clips or seals in order to make up a composite freight unit. With this arrangement, it was believed that the composite freight units would remain substantially in place in the transportation vehicle by frictional contact of the vehicle floor. However, when several composite freight units of the type noted above were placed on a freight transportation vehicle it was found that the individual pieces of freight making up the composite unit shifted sufficiently to loosen the encircling bands and the individual composite freight units also shifted with respect to one another sufficiently to cause at times, considerable damage to the pieces of freight. The principal objection to the last mentioned method of securing freight loads is that special strapping tools, clips and seals for fastening the metal binders or bands, are not always available at the loading or shipping points and it was necessary to resort to the first method described above of securing a freight load. Another objection to the above described method of securing a freight load is that it was virtually impossible to resecure the individual composite freight units if they became loosened during the course of transportation of the vehicle.

The main object of the present invention is to provide an improved load securing device for freight transportation vehicles which is rugged in construction and relatively inexpensive to manufacture.

A further object is to provide a winch mechanism which is permanently secured to a transportation vehicle and which employs metal bands or straps to secure relatively large load units of freight together in desired positions on the vehicle.

A still further object is to provide a strapping winch for freight loading which may be repeatedly adjusted in order to take up any slack in the binding straps or bands securing the load, which normally occurs as a result of shocks and vibrations incident to the travel of the freight transportation vehicle.

Other objects and features of this invention, together with the advantages thereof, will best be understood by reference to the following specification taken in connection with the accompanying drawings, in which:

Fig. 1 is a side plan view of one form of winch mechanism constructed and arranged in accordance with this invention;

Fig. 2 is a sectional view taken along line 2—2 of Fig. 1;

Fig. 3 is a top plan view of the winch mechanism illustrated in Fig. 1;

Fig. 4 is an end view of the winch mechanism illustrated in Fig. 1 and shows a portion of a metal strap or band being wound upon the arbor of the winch;

Fig. 5 is a front view of a modified form of the invention;

Fig. 6 is a sectional view taken along line 6—6 of Fig. 5; and,

Fig. 7 is a sectional plan view of a transportation vehicle illustrating the use of the winch mechanism of the present invention in securing freight load units in place.

Referring now to Figs. 1 to 4, inclusive, it will be seen that the winch mechanism 10 comprises four individual elements including a pair of angle brackets 11a and 11b, a spool 12 and a locking pin 13. These elements are arranged in the manner illustrated and the angle brackets 11a and 11b are secured to a transportation vehicle to provide an adjustable winch mechanism.

The different elements of the winch mechanism 10 are preferably designed in the manner to be described hereinafter. The angle brackets 11a, 11b are of identical construction and each bracket includes a pair of mounting holes 14a, 14b, a pair of locking pin holes 15a, 15b and a relatively large bearing hole 16.

The spool 12 is a unitary casting and it includes a relatively large hub member 17 having oppositely disposed arbors 18a and 18b which are formed integrally therewith. The arbors 18a and 18b are respectively inserted into the bearing holes 16 provided respectively in the angle brackets 11a and 11b. Furthermore, the arbors 18a and 18b are formed respectively with elongated slots 21a and 21b which extend diametrically through the center of the arbors and along the central axis thereof to a point adjacent the bearing holes 16. Each of the slots 21a and 21b is preferably formed to receive at least two layers of metal strapping bands, although only one strapping band 22 is illustrated in Fig. 4.

The hub member 17, which forms a part of the spool 12, is provided with a plurality of equally spaced adjusting holes 19 extending diametrically throughout the center of the hub member 17 in a plane perpendicular to the axis of the arbor 18a. These adjusting holes 19 are of sufficient diameter to receive the end of a pinch bar, crowbar or the like, which is normally included as part of the tool equipment provided for freight handlers. The manner in which the winch 10 may be adjusted will be described hereinafter.

In addition to the adjusting holes 19, the hub member 17 is provided in the peripheral surface thereof with equally spaced semicircular cut-outs 20. More specifically, the semicircular cut-outs 20 are equally spaced between each of the adjusting holes 19 and they are formed in the circumferential surface of the hub member 17 so that they are parallel to the axis of the spool 12. The cut-outs 20 cooperate with the locking pin 13, which may be an ordinary bolt, in order to lock the spool 12 against rotation in either direction. Accordingly, the locking pin holes 15a and 15b in the angle brackets 11a and 11b are in alignment with each other and they are in alignment with the circumferential surface of the hub member 17 so that the locking pin 13 may be inserted in the appropriate set of locking pin holes when one of the cut-outs 20 has been rotated to a corresponding position.

Referring now to Fig. 4, it will be seen that a metal strap 22 may be placed into the slots 21a and 21b and wound around the arbor 18b by merely rotating the hub member 17. The metal strap 22 is preferably formed of strip sheet metal, the gauge of which depends upon the size and width of the freight load which is to be secured by the winch mechanism 10. Strip sheet metal bands of the type commonly used by shippers and freight loaders in conjunction with the previously mentioned special strapping tools, clips and seals, may be satisfactorily employed with the winch mechanism 10 to secure freight in place on a transportation vehicle.

Since the spool 12 is rotatably supported in the bearing holes 16 on the angle brackets 11a, 11b the radius of the hub member 17 must necessarily be slightly less than the distance between the center line of the bearing holes 16 and the right angle edge of the angle brackets 11a or 11b. This limitation with regard to the diameter of the hub member 17 follows from the fact that the periphery of the hub member 17 must clear the surface upon which the brackets 11a, 11b are mounted.

In the form of the invention illustrated in Figs. 5 and 6, the winch mechanism 30 comprises a housing 31, a spool 32 and a locking pin 33.

The housing 31 is formed as a unitary structure having a rear wall 31a, a top wall 31b, side walls 31c and 31d and a mid-section wall 31e. The housing 31 also includes a bottom wall 31f which is removably secured to the housing by means of a plurality of bolts 34. The mid-section wall 31e and the bottom wall 31f are respectively provided with bearing holes 35a and 35b and they are also respectively provided with locking pin holes 37a, 38a and 37b, 38b.

The spool 32 includes a relatively large hub member 39 and oppositely disposed arbors 40a and 40b which are formed integrally therewith. In order to rotatably support the spool 32 in the housing 31 in the manner illustrated, the arbor 40a is inserted into the bearing hole 35a in the mid-section wall 31e and the arbor 40b is inserted into the bearing hole 35b in the bottom wall 31f as the latter is secured to the housing 31 by means of the bolts 34.

The arbor 40a is formed with an elongated slot 41 extending diametrically through the center of the arbor and along the central axis thereof to a point adjacent the bearing hole 35a in the mid-section wall 31e. The slot 41 is substantially identical to the slot 21b in the winch mechanism 10, previously described, and is preferably formed to receive at least two layers of a metal strapping band, such as the strap 22 illustrated in Fig. 4.

The hub member 39 is also provided with a plurality of equally spaced adjusting holes 42 extending diametrically through the center of the hub member 39 in a plane perpendicular to the axis of the arbor 40a. These adjusting holes 42 are of sufficient diameter to receive the end of a pinch bar, crowbar, or the like, which is normally included as part of the tool equipment provided for freight handlers.

In addition to the foregoing, the hub member 39 is provided with equally spaced semicircular cut-outs 36 in the peripheral surface thereof. More specifically, the cut-outs 36 are equally spaced between each of the adjusting holes 42 and they are formed in the circumferential surface of the hub member 39 so that they are parallel to the axis of the spool 32. The cut-outs 36 cooperate with the locking pin 33, which may be an ordinary bolt, to lock the spool 32 against rotation in either direction. Accordingly, the locking pin holes 37a and 38a in the mid-section wall 31e are respectively in alignment with the locking pin holes 37b and 38b provided in the bottom wall 31f. Also, the locking pin holes, noted above, are in alignment with the circumferential surface of the hub member 39 so that the locking pin 33 may be inserted into the appropriate set of locking pin holes when one of the semicircular cut-outs 36 has been rotated into a corresponding position.

It should be noted that the arbor 40b on the spool 32 is only of sufficient length to extend through the bearing hole 35b in the bottom wall 31f. Accordingly, it will be appreciated that the spool 32, in the modification shown in Figs. 5 and 6, is exactly the same as the spool 12, illustrated in Figs. 1 to 4, inclusive, except that the portion of the arbor 18a including the slotted portion 21a has been severed from the spool.

Fig. 7 of the drawing schematically illustrates various methods of securing freight load units to a freight car by employing the winch mechanism 10, disclosed in Figs. 1 to 4, inclusive, and the winch mechanism 30, disclosed in Figs. 5 and 6. Although both forms of winch mechanisms have been utilized in securing the freight units disclosed in Fig. 7, it should be understood that either form of winch mechanism may be separately employed. In Fig. 7, each of the winch mechanisms 30a, 30b etc. corresponds to the winch mechanism 30 illustrated in Figs. 5 and 6 and each of the winch mechanisms 10a, 10b etc. corresponds to the winch mechanism 10 illustrated in Figs. 1 to 4, inclusive. The winch mechanisms 30a, 30b etc. may be counter-sunk into the lining forming the side wall structure of the freight car 50 so that the front surface of each of the winch mechanisms is substantially flush with the inside wall surface of the freight car 50. These winch mechanisms may be permanently secured to the freight car structure, without interfering with the loading space within the car, in any desired manner, such as by welding, bolting or the like. In order to retain the freight unit 51 in position, a metal strap 55 is placed in the slot on the arbor of the winch mechanism 30a and the associated spool is rotated at least one turn in order to wind the strap 55 around the arbor. The locking pin of the winch mechanism 30a may now be inserted into the locking pin holes in order to prevent rotation of the associated spool. The opposite end of the metal strap 55 is secured in the same manner to the winch mechanism 30d provided in the opposite wall of the freight car 50. In order to tighten the strap 55, the freight loader may insert a rod, such as a pinch bar or crowbar, into one of the adjusting holes provided in the spool of the winch mechanism 30a or 30d and hold the spool against rotation as the locking pin is withdrawn. The length of the pinch bar provides sufficient leverage to enable the freight loader to easily rotate the spool of the winch mechanism until the strap 55 is tensioned sufficiently to securely fasten the freight unit 51 in position. When the spool is rotated to a position where a cut-out in the periphery of the spool is in alignment with either set of locking pin holes, the locking pin may be replaced in order to lock the spool against further rotation.

Another arrangement of securing freight loads is shown at the opposite end of the car 50. In this arrangement two smaller freight load units 53 and 54 are secured in opposite corners of the freight car 50 by means of the straps 57 and 58 and the winch mechanisms 30e, 30f, 30g and 30h. However, in order to provide adequate space between units 53 and 54 and the end wall of the freight car 50, spacer blocks 56 have been provided. These spacer blocks provide sufficient space between the end of the car and the freight units to enable the freight loader to fasten the ends of the metal straps 57 and 58 in the winch mechanisms 30e, 30f, 30g and 30h in the manner hereinbefore described.

The freight load unit 52, illustrated in the central portion of the freight car 50, is secured by means of winch mechanisms 10a, 10b, 10c and 10d. These winch mechanisms are secured to the side walls of the freight car 50 in a vertical position, that is, with the axis of the mechanisms perpendicular to the floor of the car. Accordingly, the angle brackets of each winch mechanism are secured to the side wall of the car, in any desirable manner, at a convenient level from the floor of the car. For example, the winch mechanisms 10a and 10b may be secured to one side wall of the freight car 50 and the winch mechanisms 10c and 10d may be secured to the opposite side wall thereof.

In order to secure the freight load unit 52 in place, the opposite ends of a metal strap 57a are placed in the slots in the arbors of the respective winch mechanisms 10a and 10b; the opposite ends of a metal strap 57b are placed in the slots in the arbors of the respective winch mechanisms 10b and 10c; the opposite ends of a metal strap 57c are placed in the slots in the arbors of the respective winch mechanisms 10c and 10d; and the opposite ends of a metal strap 57d are placed in the slots in the arbors of the respective winch mechanisms 10d and 10a. In this manner, the load unit 52 is completely surrounded by the four separate straps 57a to 57d, inclusive. The four winch mechanisms 10a to 10d, inclusive, may be individually rotated, in the manner previously described, in order to securely fasten the load unit 52 in position in the car 50.

The above arrangements for securing the freight loads 51, 52, 53 and 54 on the freight car 50 are merely illustrative of many combinations which may be utilized. It should be understood that although the winch mechanisms 10a to 10d, inclusive, are shown secured to the side wall structure of the freight car, they may also be secured to the floor of the car in any desired manner. In the latter event, the metal strap members may be placed over the top of the freight load unit instead of around the sides thereof.

In all of the above arrangements for securing freight load units on a transportation vehicle, the freight handlers or the members of a train crew may be required to readjust the various winch mechanisms in order to resecure the associated freight load units due to the fact that the starting, stopping and vibrations of the vehicle, during the course of shipping, the freight units will loosen the metal binding straps. These adjustments may readily be made, as previously noted, by utilizing a pinch bar, crowbar or rod to hold the spool of the winch mechanisms, removing the locking pin and replacing the same after the tightening operation has been performed.

In the winch mechanism 10, illustrated in Figs. 1 to 4, inclusive, and the modified winch mechanism 30, illustrated in Figs. 5 and 6, the locking pins 13 and 33 are shown as independent removable elements. It should be understood however, that each of the pins 13 and 33 may be secured to its individual winch mechanism by means of a flexible connection, such as a chain, so as to prevent loss of the locking pin.

From the foregoing, it will be readily apparent that the two forms of the invention disclosed will secure freight loads against movement during transportation and that they may be readjusted at will. While two embodiments of the invention have been disclosed, it will be understood that various modifications may be made therein without departing from the true spirit and scope of the invention.

I claim:

1. A load securing device mounted on a freight transportation vehicle comprising in combination, spaced apart L-shaped flange members adapted to be secured to said vehicle, a spool member positioned between said flange members, oppositely disposed shafts formed along the axis of said spool rotatably supported by said flange members, said spool member having a body portion of greater diameter than the diameter of said shafts and having a plurality of spaced apart openings in said body portion extending radially from the axis of said spool in circumferential alignment and adapted to receive the end of a conventional pinch bar or crowbar in order to rotate said spool in either direction, a plurality of spaced apart parallel concaved cut-outs formed in the periphery of said body portion of said spool parallel to said axis, said flange members having oppositely disposed openings therein in alignment with the periphery of said body portion of said spool, a slot formed in each of said shafts to receive binding strap members which have been passed around at least a portion of a freight load unit and adapted to wind said binding strap members around said shafts as said body portion of said spool member is rotated in either direction, and a locking pin adapted to be inserted between said flanges through said openings therein only in the event one of said cut-outs in said body portion of said spool is in alignment therewith in order to lock said spool against rotation in either direction.

2. A load securing device for a freight transportation vehicle comprising a housing member having a front opening therein, a dividing wall in said housing, a spool member positioned between one wall of said housing and said dividing wall, oppositely disposed shafts formed along the axis of said spool respectively supported for rotation on said one wall and said dividing wall, said spool member having a plurality of spaced apart openings therein extending radially from the axis of said spool adapted to receive the end of a conventional pinch bar or crowbar in order to rotate said spool about its axis in either direction, said spool having a plurality of spaced apart cut-outs formed in the periphery thereof parallel to said axis, said dividing wall and said one wall having oppositely disposed openings therein in alignment with the periphery of said spool and parallel to the axis thereof, means formed in the one of said shafts rotatably supported by said dividing wall for receiving one or more binding members which have been passed around at least a portion of the freight load unit and adapted to wind said binding members around said shaft as said spool member is rotated, a locking pin adapted to be inserted between said dividing wall and said one wall through the said openings therein only in the event one of said cut-outs is in alignment therewith in order to lock said spool against rotation in either direction, and means for demountably securing said one wall on said housing in order to remove said spool member from said housing.

3. A load securing device for a freight transportation vehicle comprising in combination, a housing having a front opening therein, a dividing wall in said housing forming oppositely disposed chambers, a spool member positioned in one of said chambers between said dividing wall and one wall of said housing, oppositely disposed shafts formed along the axis of said spool rotatably supporting said spool within said one chamber with one of said shafts extending into the other of said chambers, said spool member having a plurality of spaced apart openings therein extending radially from the axis in circumferential alignment adapted to receive the end of a conventional pinch bar or crowbar in order to rotate said spool about its axis in either direction, said spool having a plurality of spaced apart concaved cutouts formed in the periphery thereof parallel to said axis and between adjacent ones of said openings, said dividing wall and said one housing wall having oppositely disposed openings therein in alignment with the periphery of said spool and parallel to the axis thereof, a slot formed in the portion of said one shaft which extends into said other chamber for receiving one or more binding members which have been passed around at least a portion of the freight load unit and adapted to wind said binding members around said one shaft as said spool member is rotated, and a locking pin adapted to be inserted between said dividing wall and said one housing wall through the said openings therein only in the event one of said concaved cutouts is in alignment therewith in order to lock said spool against rotation in either direction.

MICHAEL A. SCHINKER.

References Cited in the file of this patent

UNITED STATES PATENTS

| Number | Name | Date |
| --- | --- | --- |
| 1,216,825 | McMillan | Feb. 20, 1917 |
| 1,249,257 | Venard | Dec. 4, 1917 |
| 1,403,042 | Leonard | Jan. 10, 1922 |
| 2,230,373 | Briggs et al. | Feb. 4, 1941 |